United States Patent
Kresta

[11] 3,878,013
[45] Apr. 15, 1975

[54] VEHICLE TIRE WITH TIRE BEAD PLY MEANS AND METHOD FOR THE MANUFACTURE THEREOF

[75] Inventor: Erich Kresta, Perchtoldsdorf, Austria

[73] Assignee: Semperit Aktiengesellschaft, Vienna, Austria

[22] Filed: Nov. 6, 1972

[21] Appl. No.: 304,208

[30] Foreign Application Priority Data
Nov. 10, 1971 Austria............................ 9717/71

[52] U.S. Cl.............................. 156/132; 156/135
[51] Int. Cl...................... B29h 17/12; B29h 17/24
[58] Field of Search .......... 156/131, 132, 135, 123, 156/116

[56] References Cited
UNITED STATES PATENTS
1,403,091  1/1922  Midgley.......................... 156/132 X
2,947,342  8/1960  Holloway....................... 156/131 X FOREIGN PATENTS OR APPLICATIONS
2,023,015  8/1970  France
7,119  5/1927  Australia............................ 156/123

OTHER PUBLICATIONS
Abstract of French 2,023,015 patent cited above.

Primary Examiner—Clifton B. Cosby
Attorney, Agent, or Firm—Werner W. Kleeman

[57] ABSTRACT

A vehicle tire provided at its bead surface with a pre-vulcanized ply or a ply formed of a harder rubber mixture than the rubber mixture generally employed at the bead region. Each bead region of the tire possesses one such ply at its inner surface, and both plies are arranged at a spacing from one another.

The method of manufacturing such vehicle tire, comprises the steps of building-up a tire blank, during the course of the tire build-up applying at the inside of the tire, at both tire bead regions, plies formed of a harder rubber mixture than the rubber mixture employed for other regions of the tire beads or the inner plate of the tire or both.

7 Claims, 10 Drawing Figures

VEHICLE TIRE WITH TIRE BEAD PLY MEANS AND METHOD FOR THE MANUFACTURE THEREOF

BACKGROUND OF THE INVENTION

The present invention relates to new and improved constructions of vehicle tires of the type provided at their bead surface with a pre-vulcanized ply or a ply consisting of a harder rubber mixture than the rubber mixture usually employed at the bead region and a method for the manufacture thereof.

Such vehicle tires are known to the art, as exemplified for instance in French Pat. No. 2,023,015. With these state-of-the-art constructions the ply consists of a layer having increased hardness relative to the neighboring rubber layer or ply, so that the loads exerted by the wheel rim shoulder or rim flange can be absorbed much better. A drawback of the known constructions resides in the fact that during build-up of the tire, especially during bowing or dishing thereof, deformations occur at the region of the carcass assembly due to compression of both bead regions, these deformations oftentimes resulting in kinking or buckling. Furthermore, it has been found that due to the formation of cavities at the inside of the tire it is impossible to prevent the formation of fissures which again during vulcanization produce sealing difficulties.

Although such drawbacks do not arise with other known tire constructions wherein same possess a continuous inner plate at the inside of the tire, yet such tire constructions are extremely difficult to dish or bow.

SUMMARY OF THE INVENTION

Therefore, it is a primary object of the present invention to provide a new and improved construction of tire which is not associated with the aforementioned drawbacks and limitations of the state-of-the-art proposals and an improved method for the manufacture thereof.

Another and more specific object of the present invention aims at overcoming the drawbacks of the prior art constructions while retaining the advantages thereof and, in particular, producing a tire which, on the one hand, can be easily dished or bowed without the use of a bellows or bag during the course of manufacture thereof and, on the other hand, does not lead to the formation of kinks or the like in the carcass as well as not having the tendency towards forming fissures or cracks and furthermore does not exhibit any sealing problems during vulcanization.

Now in order to implement these and still further objects of the invention, which will become more readily apparent as the description proceeds, the invention starts from the previously mentioned prior art construction and fulfills the aforementioned objectives essentially in that the aforementioned ply is provided at the inner surface of the bead region of the tire. In particular, each bead region of the tire is provided with one such ply at its inner surface and both of the plies are spaced from one another. Consequently, there is avoided the formation of fissures and kinks in the carcass during compression of the ends of the beads during bagless or bellowless dishing of the tire since the ply, which functions in the manner of a reinforcement of the bead region of the tire, during dishing of the tire, prevents the bead region from being buckled or kinked or in some other manner impermissively loaded. Also the tire dishing operation is no longer difficult since the ply, which owing to its greater hardness could hinder such dishing, is only advantagesously provided at the bead region of the tire. Significantly, this ply is not present at the sidewall and tread region of the tire, and consequently does not produce at those locations difficulties as concerns the dishing or bowing of the tire.

The bead region of the tire is to be understood to define region which comes into contact with the wheel rim. It is approximately equal to that region of the tire which, during loading of the tire, is not subjected to the squeezing action because it is supported by the wheel rim.

It is advantagously within the contemplation of this invention to guide the ply about the root or toe of the bead and, if desired, to draw such upwardly along the outer surface of the tire bead. As already mentioned, it is known to the art to use at this region a ply formed of a harder rubber mixture. This ply can be integral with the ply located at the inner surface of the tire, so that during build-up of the tire of the tire no additional work is necessary. Additionally, there is thereby realized the advantage that none of these plies are located at regions of the bead end of the tire which are particularly loaded. Hence, deformation of the bead during vulcanization cannot arise, since during vulcanization a harder ply supports and retains the bead region.

It has been found to be advantageously if, according to the invention, the reinforcement ply at the inner surface of the tire only extends up to the transition region between the sidewall and bead region of the tire. At this location the reinforcement ply can either terminate or transform into an inner plate known as such to the art which is not pre-vulcanized. In order to provide for a gradual transition it is a further aspect of the invention to construct the edge of the reinforcement ply neighboring the sidewall with a tapered portion. This tapered portion insures a gradual transition with the neighboring portions of the tire. According to the invention the tapered portion is advantageously overlapped at the inside of the tire by the edge of the neighboring layer. Such overlapping is more favorable than a butt joint since the adhering surface, by means of which the pre-vulcanized ply merges with the neighboring plies is increased. The arrangement of the over-lapping edge of the neighboring layer at the inside of the tire is more favorable for the reason that in this manner the tip formed by the tapered end of the pre-vulcanized ply is embedded between non-pre-vulcanized plies and in this way secured much better.

A further possibility of forming the tapered portion at the pre-vulcanized ply or a ply formed from a heater rubber mixture can be realized according to the invention in that the ply consists of a number of layers which are offset in a step-like fashion from one another. In this way there are realized better sealing characteristics at the joint between the pre-vulcanized ply or the ply formed by the harder rubber mixture and the neighboring ply, for instance an inner plate which is not pre-vulcanized, so that there can be avoided penetration of air during vulcanization at such joint owing to the labyrinth arrangement which is provided by the steps or gradual transitions. The step-shaped construction of the tapered portion can be easily realized during tire fabrication in the drum wind-up operation in that the layers are applied in a a spiral-shaped formation and/or helical-shaped formation to the tire build-up or winding drum.

Another improvement as concerns avoiding, during vulcanization, penetration of air at the joint between the pre-vulcanized ply or the harder ply and the neighboring ply, especially the inner plate, can be realized according to a further aspect of this development which contemplates appropriately profiling the plies extending in the peripheral direction of the tire. Such profiling can be provided both at the bevelled tapered portion of the end of the ply as well as also at that side surface of the ply which such bears against the tire bead. The neighboring layer, especially the inner plate, engages with such profiling, so that there is realized so to speak a tooth-like meshing action between these two layers.

In order to improve upon the adhesion properties of the ply formed as a pre-vulcanized ply it is within the contemplation of this invention to provide such ply with an adhering layer or coating. Furthermore, it is recommended according to the invention to provide the ply with a reduced thickness or with recesses at the concave side of the flexed or bent portions in order to improve upon the kinking or buckling behavior at the region of the flexed or bent portions. Consequently, the bending characteristics of the pre-vulcanized ply are favorably enhanced during dishing, without reducing the protective action of such pre-vulcanized ply or the ply consisting of a harder rubber mixture at the bead end. The ply recesses confronting the bead simultaneously form an anchoring for the ply at the bead, since during vulcanization the material of the neighboring plies of the bead can flow into the portions of the recesses which remain after dishing.

The reinforcement ply at the inner surface of a strip advantageously possesses, according to a further aspect of the invention, prior to vulcanization a modulus of elasticity with 200% elongation of $M_{200} = 45–70$ kp/cm$^2$, preferably 50–65 kp/cm$^2$. Experiments have shown that these values are particularly suitable.

BRIEF DESCRIPTION OF THE DRAWINGS

The invention will be better understood and objects other than those set forth above, will become apparent when consideration is given to the following detailed description thereof. Such description makes reference to the annexed drawings wherein.

DETAILED DESCRIPTION OF THE PREFERRED EMBODIMENTS

Figure 1:
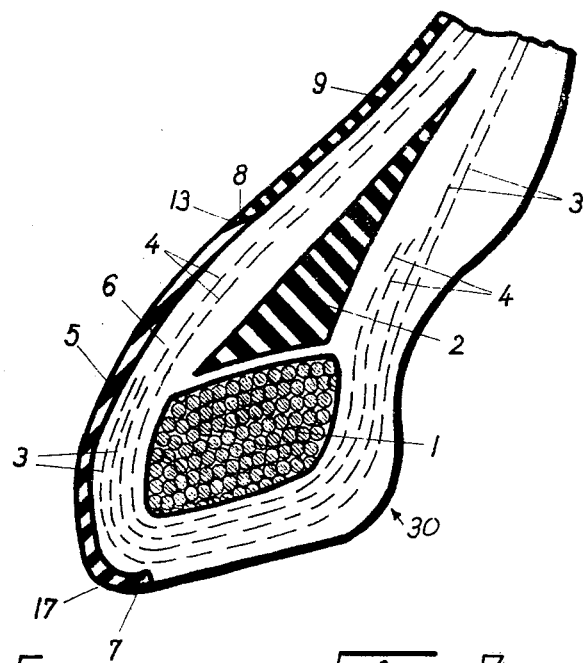
FIG. 1 is a fragmentary sectional view through a bead end of a first embodiment of vehicle tire.

Turning now more specifically to the drawings, it is to be understood that only enough of the tire construction will be shown to simplify clarity in illustration and as in necessary for those skilled in the art to understand the underlying concepts of this development. Directing attention therefore specifically to the showing the FIG. 1, it will be seen that at each bead end region 30 and of the tire there is arranged a bead core 1 formed of wire and at which merges a bead wedge 2. A number of carcass layers 3, 4 are wrapped about the bead core 1 and the bead wedge 2. At the inner surface of the tire there is arranged a prevulcanized ply 5 of greater hardness than the neighboring layers. If desired, the ply 5 can constitute a ply formed of a rubber mixture of increased hardness. The modulus of elasticity of this ply 5 for 200% elongation prior to vulcanization amounts to $M_{200} = 45–70$ kp/cm$^2$, preferably 50–65 kp/cm$^2$. The Shore hardness of such pre-vulcanized ply or layer 5 is greater than that of the neighboring plies and amounts to about 85, whereas the Shore hardness of the neighboring rubber layer 6 amounts to about 55. During fabrication of the tire, especially during the bellowless dishing and during vulcanization, the ply 5 functions as a reinforcement or stiffening for the bead, so that the clamping portion of the tire formed by the bead is stable and rigid and therefore does not tend towards impermissible deformations during fabrication which could produce kinks, buckling or fissures, especially at the region of the carcass assembly.

Figure 10:
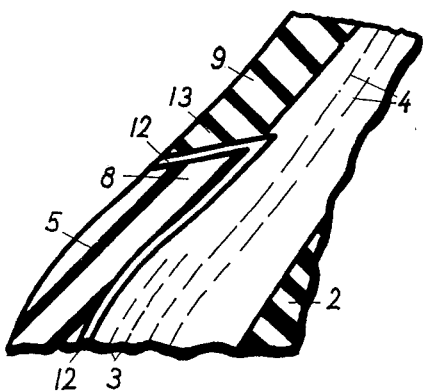

As will be apparent, the pre-vulcanized ply 5 is drawn upwardly from the bead root or toe 7 along the inner surface of the tire up to approximately that region which during loading of the tire during running is not subjected to the squeezing action, because it is supported by the wheel rim. Generally such is the region which comes into contact with the wheel rim. In the exemplary embodiment under consideration the ply 5 extends approximately to one-half of the height of the bead wedge 2 and at that location is provided with a tapered portion 8 by means of which the ply 5 gradually transforms into a conventional non-prevulcanized inner plate or liner which extends over the remaining portion of the inner surface of the tire. As should be further apparent the inner plate 9 overlaps the ply 5 in such a way that at the inner surface of the tire inner plate 9 extends by means of its edge 13 further downward than the ply 5. This overlapping arrangement is more advantageous than the reverse arrangement since the pointed tapered edge of the ply 5 is thus located at the inside. Consequently, there is prevented detachment of this pointed converging edge of the tapered portion 8, so that during vulcanization there is prevented penetration of air at this location. This is particularly of importance when using a ply 5 formed of pre-vulcanized material, since the pre-vulcanization generally reduces the adhesion properties of the ply 5 with the neighboring plies. This adherence capability can be, however, agan increased in that the ply 5 is provided with an adhering layer or coating 12 formed of a material suitable for such purposes as is well known in this art, and as best seen by referring to FIG. 10.

Figure 2:
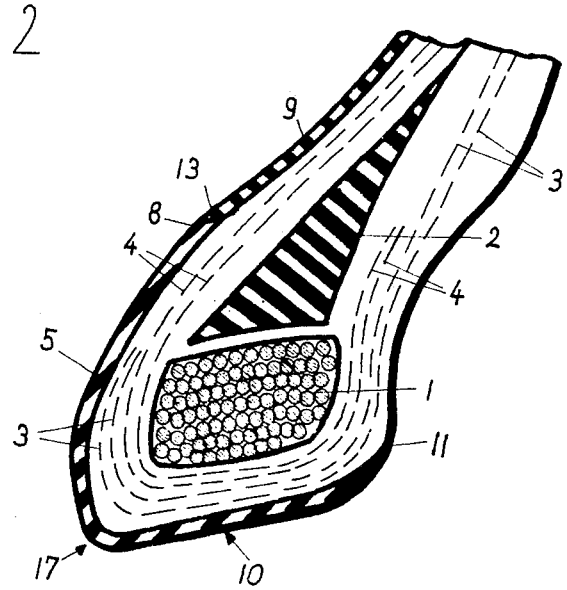
FIG. 2 is a fragmentary sectional view through the bead end of a second embodiment of inventive vehicle tire.
Figure 3:
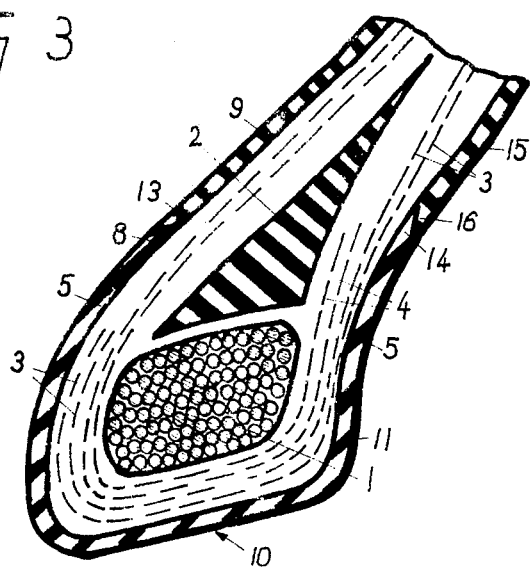
FIG. 3 is a fragmentary sectional view through the bead end of a third embodiment of inventive tire.

The embodiments of FIGS. 2 and 3 differ from that of FIG. 1 in that the ply 5 is guided about the bead root or toe portion 17 as well as about the region 10 (bead base) of the tire which bears at the rim shoulder or flange, as best seen by referring to FIG. 2, and if desired a piece or portion thereof can be pulled upwardly at the outer surface 11 of the bead, as best seen by referring to the embodiment of FIG. 3. These portions of the ply 5 are formed of one piece with the portion, which has been depicted in FIG. 1, so that the entire ply 5 forms a coherent or uniform entity which holds the highly-loaded portion of the bead end.

With the embodiment of FIG. 3 the end of the ply 5 lying at the outside of the tire bead is likewise provided with a tapered portion 14 which is overlapped by the edge 16 of the neighboring layer 15.

Figure 4:
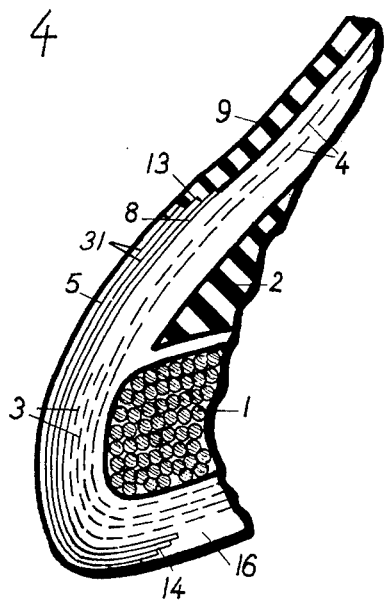

The tapered portion need not be constructed so as to continuously extend in tapered fashion, as such has been depicted for the embodiments of FIGS. 1 to 3. For instance, as shown with the embodiment of FIG. 4 it can also be designed to extend in a step-like fashion. Consequently, there is produced a toothlike transition of the ply or layer 5 into the neighboring layers. For constructing such tooth arrangement it is recommended that the ply 5, during fabrication of the tire, be formed of a number of layers, for instance in the arrangement of FIG. 4 from four layers 31, which are offset in a step-shaped fashion with regard to one another. This can be easily realized during tire manufacture in that the layers are applied to the conventional winding or build-up drum in a spiral-shaped formation and/or a helical-shaped formation. This type of layer formation is known as such in the art. As depicted in FIG. 4 the stepped portions are situated in such a way that the tapered portions 8 or 14 respectively of the ply 5 which are formed thereby are overlapped by the neighboring layers 9 and 16 respectively.

Figures 5, 7:
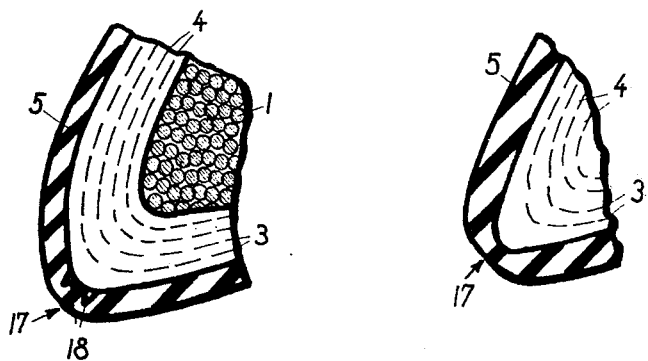
FIGS. 4 and 5 are respective sectional views through the bead root or toe region of a tire.
FIG. 7 illustrates a modified embodiment from that shown in FIG. 5.
Figure 6:
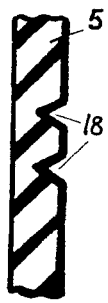
FIG. 6 illustrates details of the ply used in the embodiment of FIG. 5 prior to bending undertaken during the course of dishing.

With the embodiment of FIG. 5 the ply 5 exhibits a number of recesses 18 at the region of the bead root or toe 17 for the purpose of improving the kinking or buckling behavior. These recesses 18 are formed by grooves provided at the pre-vulcanized layer 5, the grooves being triangular in cross-section, as best seen by referring to FIG. 6 depicting the ply in its extended state prior to dishing. Such grooves 18 facilitate the bending and kinking process of the pre-vulcanized layer during the bellowless dishing or arching of the tire, wherein the hollow cavities or compartments of such grooves 18 which remain following dishing of the tire are filled during vulcanization by the flowing rubber material from the neighboring layers of the bead root or toe. In this way there is realized an anchoring of the ply 5 at such layers of the bead root, so that the coherency of all of the layers is improved.

In addition to the construction of such recesses 18 or in lieu thereof the ply 5 can exhibit at the region of its bowed or flexed portions an irregular thickness, as depicted for the embodiment of FIG. 7. Also in this way there is improved the kinking- and bending behavior of the ply 5.

Figure 8:
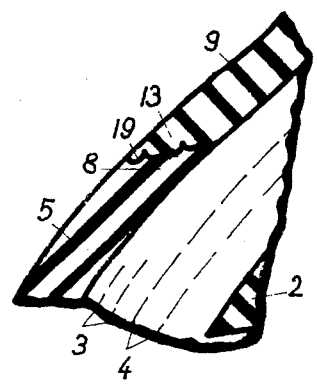
FIGS. 8, 9 and 10 illustrates respective sectional views of three variant constructional embodiments for improving the adherence of the ply with the neighboring tire portions.
Figure 9:
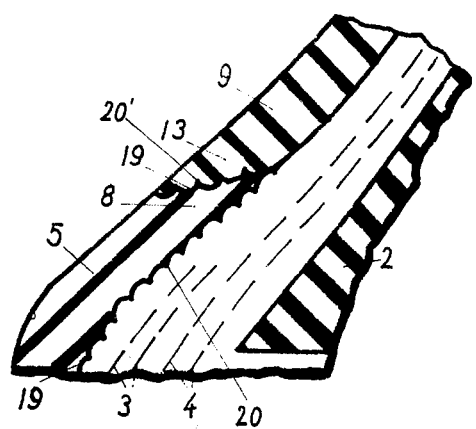

A further improvement of the adherence of the ply 5 with the neighboring layers or plies can be realized in that the ply 5 is provided at the joint surface of its tapered portion 8 with profiled portion 19 which extend in the circumferential direction of the tire, as best seen by referring to FIG. 8. These profiled portions or profiling 19 can be provided in the same or different embodiments also at those surfaces of the ply 5 which bear against the carcass assembly 3, 4 of the bead toe. In this regard attention is directed to FIG. 9. Such profiled portions produce teeth into which can flow, during vulcanization, the material of the neighboring layers and in this way improve the adhesion of the ply 5.

While there is shown and described present preferred embodiments of the invention, it is to be distinctly understood that the invention is not limited thereto, but may be otherwise variously embodied and practiced within the scope of the following claims. ACCORDINGLY,

What is claimed is:

1. A method of manufacturing vehicle tire, comprising the steps of building-up a tire blank on a tire build-up drum, said tire blank having an inner wall and two bead regions, said inner wall defining the internally disposed surface of the vehicle tire, applying during the course of the tire build-up at the inner wall of the tire at both tire bead regions plies formed of a harder rubber mixture than the rubber mixture employed for other regions of the tire beads or the inner plate of the tire, or both, said rubber plies extending over at least that portion of each bead region confronting the tire build-up drum.

2. The method as defined in claim 1, including the step of employing vulcanized plies at both said tire bead reigons.

3. The method as defined in claim 2, including the step of applying an adhering layer to the plies at each tire bead region at the side thereof oppositely disposed of said tire build-up drum.

4. The method as defined in claim 1, including the step of employing plies consisting of a multi-layer ply assembly.

5. The method as defined in claim 4, wherein the multi-layer ply assembly has the individual layers thereof wound in substantially spiral-shaped configuration.

6. The method as defined in claim 4, wherein the multi-layer ply assembly has the individual layers thereof wound in substantially helical-shaped configuration.

7. A method of manufacturing a vehicle tire in a bellowless vulcanization process, comprising the steps of building-up a tire blank on a tire build-up drum, said tire blank having an inner wall and two bead regions, said inner wall defining the internally disposed surface of the vehicle tire, applying during the course of the tire build-up at the inner wall of the tire at both tire bead regions confronting the tire build-up drum plies formed of a harder rubber mixture than the rubber mixture employed for other regions of the tire beads or the inner plate of the tire, or both, in order to reinforce confronting regions of the tire beads and to at least minimize the danger of damage at such tire bead regions during the bellowless vulcanization of the tire.

* * * * *